Sept. 6, 1938.   E. G. BRIDGES   2,129,614
GLASSWARE FORMING APPARATUS
Filed Feb. 13, 1930   2 Sheets-Sheet 1
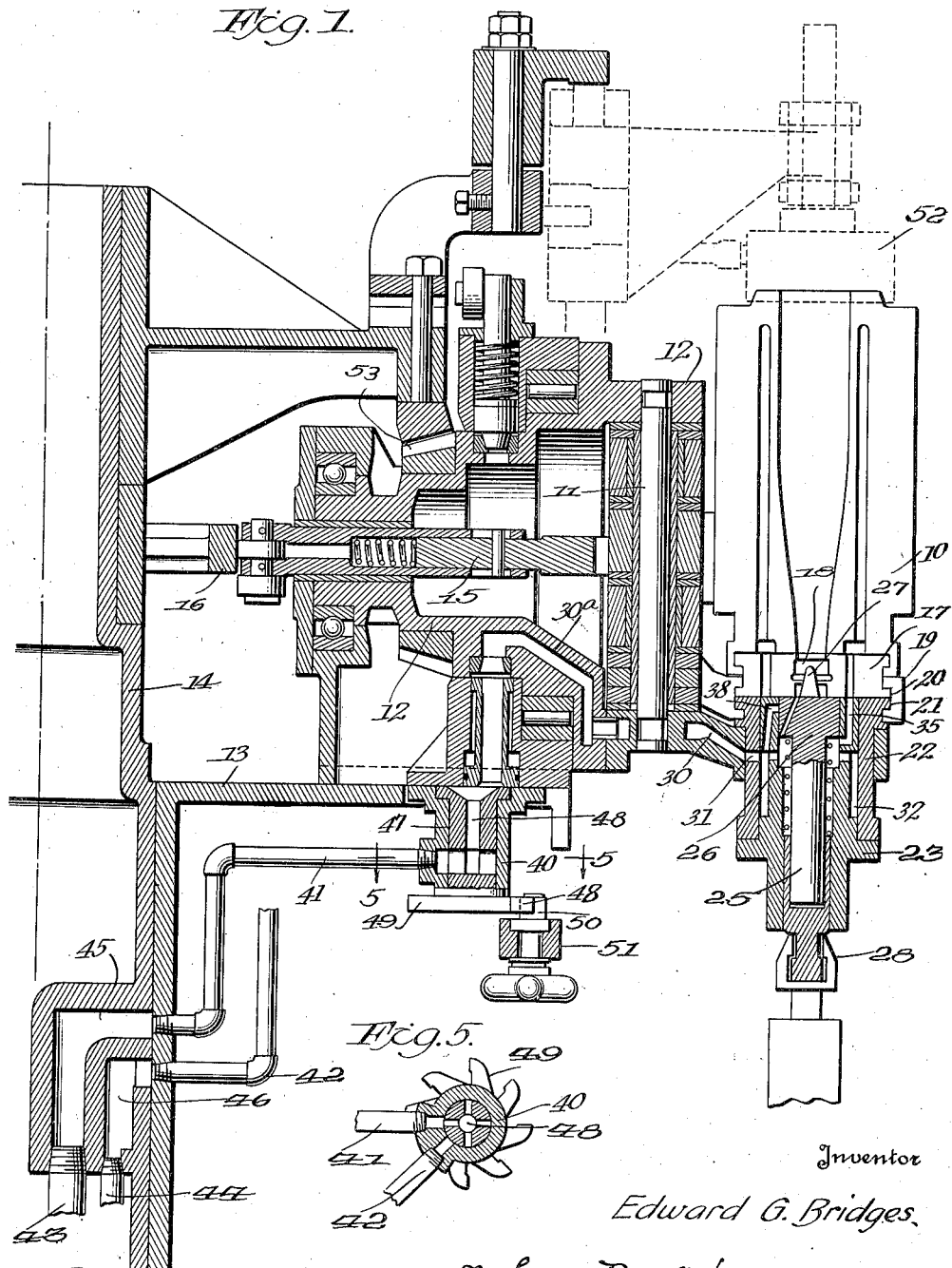
Inventor
Edward G. Bridges
By Emery, Booth, Varney & Holcombe
his Attorneys

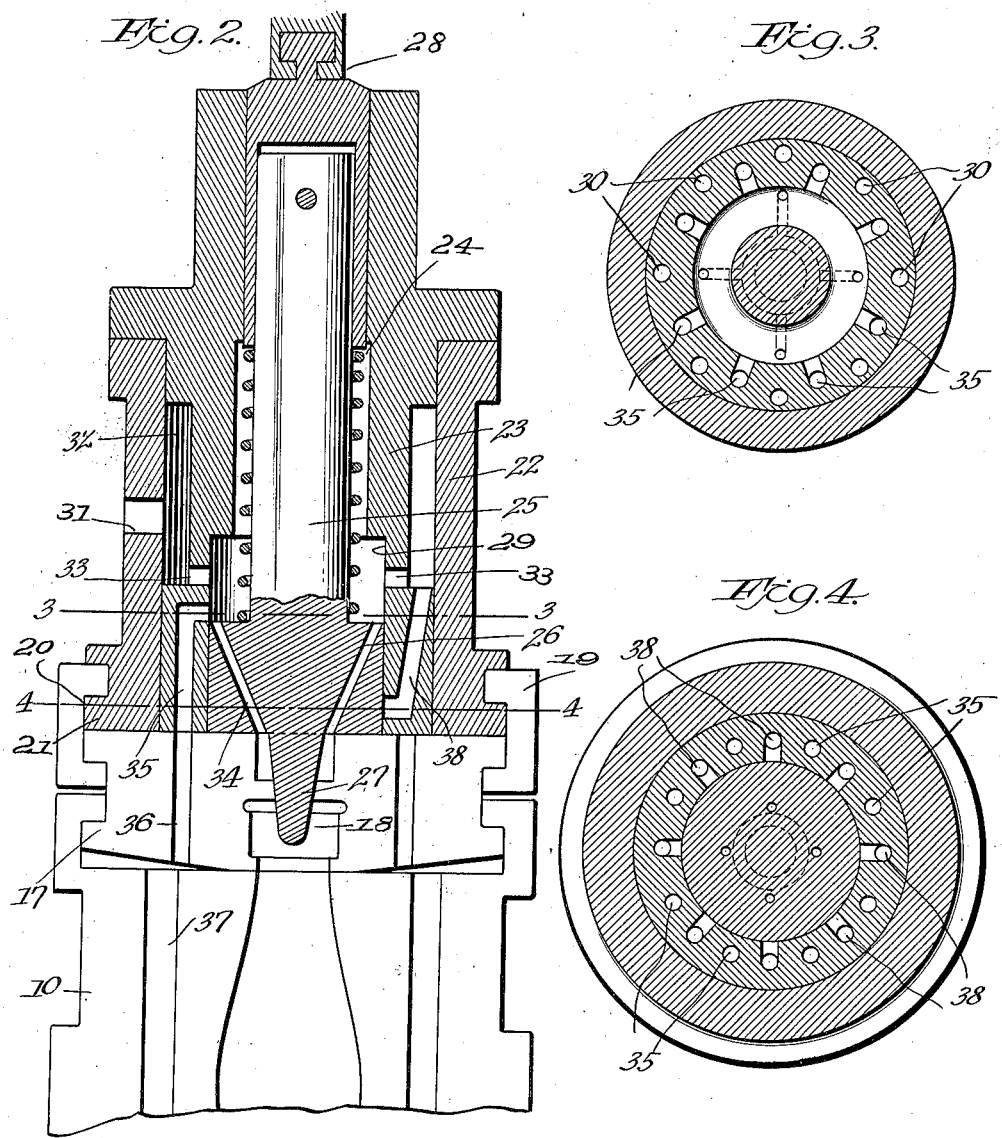

Patented Sept. 6, 1938

2,129,614

UNITED STATES PATENT OFFICE 2,129,614

GLASSWARE FORMING APPARATUS

Edward G. Bridges, Anderson, Ind., assignor to Lynch Corporation, a corporation of Indiana Application February 13, 1930, Serial No. 428,202

7 Claims. (Cl. 49—5)

The present invention relates to improvements in glassware forming apparatus, particularly apparatus designed for the manufacture of hollow glass containers, and aims generally to improve and simplify such apparatus.

In the manufacture of hollow glass containers, particularly narrow neck containers, the charge of glass is introduced into the blank or parison mold, either by dropping it from a mechanical feeding device into the open end of an inverted mold, or by bringing the open bottom of the parison mold into contact with a bath of molten glass and filling the mold with glass by applying suction in the mold, as is well understood in the art.

In either case, the charge may be compacted or consolidated in the mold by applying suction around the mouth forming pin and laterally along a substantial length of the walls of the parison mold, to compact the glass charge firmly around the mouth forming pin in its operating position, closing the neck end of the mold cavity, and thereby to form properly the mouth end of the article. Thereafter the mouth forming pin may be withdrawn and air under pressure admitted to the mouth end of the parison to elongate the cavity therein and blow the parison to hollow form of definite length suitable for transferring to a blow mold and for subsequent final blowing into bottles of uniform quality. Accordingly, the parison is usually confined in the parison mold during the counter blowing by a suitable closure or baffle plate; and in order to apply the compacting suction laterally in the parison mold cavity, the parison mold sections may be cored adjacent their meeting faces as is well understood.

The principal aims and advantages of the invention are the provision of simple means for accomplishing the above objects adaptable for machines of high speed and wide range of operation.

Illustrative of one embodiment of the invention which I find suitable for these purposes, reference may be had to the accompanying drawings, wherein—

Fig. 1 is a vertical sectional view through a parison mold and its carrying unit, of the type adapted to invert the parison mold preparatory to bringing it to a charging position, so that charges of glass from a mechanical feeding device may be delivered into the open end of the mold, showing the relative position of the parts during the application of suction to compact the charge around the mouth forming pin;

Fig. 2 is a vertical sectional view to a larger scale of suitable apparatus for shaping the mouth end of the glass charge in the parison mold, according to the present invention;

Figs. 3 and 4 are detail horizontal sectional views taken on the lines 3—3 and 4—4 of Fig. 2, respectively; and Fig. 5 is a detail sectional view of the suction and pressure air control valve as taken on the line 5—5 of Fig. 1.

Referring to the illustrative embodiment of the invention shown in the drawings, the parison mold 10 is preferably of the well known sectional type comprising opposed sections, pivotally mounted upon a hinge pin 11 of a mold support 12, rotatably mounted upon a table or carrier 13 for rotation around a central column 14. Suitable connections 15, comprising links and yokes are provided for opening and closing said mold section 10 as is well understood, the said connections 15 being herein shown as controlled by a cam 16, although obviously other means for the purpose may be provided.

Adjacent the neck end of the parison mold are sectional neck mold sections 17, providing when closed together, a neck mold cavity 18 for properly shaping the neck and mouth end of the article, and the neck mold sections 17 are supported in sectional neck mold holders 19 hingedly mounted upon the hinge pin 11 so that the neck molds may be moved to open and closed position as desired.

The neck mold holders 19 of each of the parison mold units may be grooved as at 20, to embrace the flanged end 21 of a sleeve or mouth forming pin plunger box 22, so as to align accurately the neck molds 17 and mouth forming pin during shaping of the parison in the parison mold.

Within the sleeve or housing 22 is a guide member 23 having a central opening 24 through one end for guiding a reciprocally mounted stem 25 of a plunger 26 carrying a mouth forming pin 27, adapted to be moved by suitable cam means, as shown at 28, into and away from closed position, i. e., with the pin 27 within the neck mold cavity.

The inner end of the guide member 23, (i. e. the end adjacent the neck molds 17) is formed with an enlarged bore 29 in which is slidable the mouth pin plunger head 26. This plunger head 26 and the inner end of the guide member 23, cooperate to function as a valve for controlling the suction and air pressure admitted to the housing 22 through a single supply line 30 (see Fig. 1) leading to port 31 in the housing 22, opening into a chamber 32 between the housing 22 and the guide member 23, formed as by a circumferential groove around the guide. Passages 33 establish communication from the chamber 32 to the enlarged bore 29, so that suction may be applied to the neck end of the neck mold cavity by means of passages 34 through the plunger head 26.

The inner end of the guide member 23 is formed with longitudinally extending suction passages 35 opening laterally at their upper ends into the bore 29 below the passages 33. These passages 35 open through the inner end of the guide member, where they are in communication with passages 36 extending transversely of the neck mold sections and which in turn communicate with cored passages 37 in the mating walls of the parison mold throughout a substantial length thereof, as is well understood in the art. Thus, when suction is admitted to chamber 32 through port 33, and the mouth forming pin closes the neck mold cavity, as shown in Fig. 2, suction will be effective through passages 33, chamber 29 and passages 34 to the mouth end of the parison mold cavity to draw the glass charge well into the neck mold, and simultaneously through passages 35, 36 and 37 to the body portion of the parison mold cavity to assist in drawing the charge into the mold and compacting it therein.

After the glass charges have been compacted and it is desired to counterblow the parison, the mouth pin may be withdrawn by suitable means to the position where the plunger head 26 closes passages 33 and 35, so that pressure air admitted to chamber 32 cannot be admitted to passages 35, 36 and 37 and to the parison mold cavity. At this time, however, pressure air passages 38, which are formed in the inner end of guide member 23 and are alternately disposed with respect to the suction passages 35, establish pressure air communication from the chamber 32 to the extreme inner end of the bore 29 where the passages 38 open laterally.

In some instances the mouth forming pin 27 may be relatively long (as shown in Fig. 2) and it may be desirable to start the counterblowing before the pin 27 is completely withdrawn from the neck mold.

In such cases the cam controlling the retraction of the mouth pin stem 25 may be designed so as to withdraw the mouth forming pin 27 a slight amount, but enough so that the plunger head 26 covers the lateral inlet to passages 35, when air may be admitted to the mouth end of the parison through passages 33 and 34 as well as passages 38, and at the same time preventing the flow of pressure air to passages 35, 36 and 37.

My improved apparatus for shaping the parison is advantageously embodied in a glassware forming machine of the rotary type, particularly such a machine embodying a circular series of molds mounted on a rotatable support to be moved in succession past a gathering or charging position. In such machines it is desirable that suction be applied slightly in advance of moving the mold into charging position, which is advantageously accomplished by providing a cored passage 30a in the mold support 12. Suction and pressure air are alternately admitted to passage 30a by a suitable valve 40 connected at the proper time to separate suction and pressure air lines 41 and 42 connected to suitable sources of suction 43 and pressure air 44 by stationary valve ports 45 and 46 respectively, on the central column.

The valve 40 may be of any suitable design for the purpose described, but I find that a rotary distributing valve as shown is admirably suited, which may comprise a valve casing 40 and rotary valve stem 47 having lateral inlets disposed 90 degrees apart, and each communicating with a single axial outlet 48. The stem 47 carries a series of fingers 49, preferably disposed 45 degrees apart, and adapted to engage each of a series of rollers 50, supported as at 51, and properly spread apart so as to actuate the valves 40 at proper times in the rotation of the mold carrier 13. The suction and air lines 41 and 42 are connected to inlet ports in the valve casing 40, preferably spaced 45 degrees apart, so that periodic rotations of the valve stem of 45 degrees, will alternately bring the inlet ports of the valve stem into communication with the suction and air lines 41 and 42.

From the above it will be apparent that as the mold carrier 13 is rotated to bring any one of the series of parison molds into charging position, the line 41 is brought into communication with the supply valve 45 to apply suction to the neck mold cavity, the valve 40 having previously been moved to a position to align one of the inlet parts of its stem with the suction line 41. After the mold has received its charge of glass, either by sucking it from a tank of molten glass or from a mechanical feeding device, and the charge has been properly compacted, as determined by mold travel, the valve 40 is rotated 45 degrees by contact with one of the fingers 49 with the first stop roller 50, thus cutting off the flow of suction to the mold, and establishing pressure air communication from line 42 therewith. Just prior to this, the cam mechanism controlling the mouth pin 27 has retracted the pin and plunger head 26, either partially or fully as the case may be, so that the pressure air may be admitted to the mouth end of the parison, but excluded from the body portion of the mold 10, to blow the parison to hollow form in the parison mold while confined therein by a suitable closure 52 (Fig. 1). After the parison has been blown sufficiently, as determined by mold travel, the fingers 49 of the valve 40 strike a second roller 50, which rotates the valve stem an additional 45 degrees, bringing an inlet port into alignment with suction line 41 and cutting off pressure air from line 42. However, at this time no suction will flow to the mold, because the mold is beyond the circumferential range of the supply valve 45. If desired, the suction supply valve may be of sufficient range to admit suction to the molds considerably in advance of their coming to the charging station; so as to promote cooling of the molds.

Obviously my invention is adaptable for use either with the machines which gather their charges of glass by suction, in which case the mold mounting 12 and cored passage 30a may be substantially as disclosed in my copending application, Serial No. 408,890, filed November 21, 1929, or for use with machines of the gob fed type as disclosed in Fig. 1, wherein the mold support is journalled in bearings for rotation about a horizontal axis, by means of gearing 53, after the shaping of the parison, as is well understood in the art.

Advantages of my invention reside in its simplicity of construction, permitting the maximum application of suction to the neck and parison molds while excluding the counterblowing air from the latter. The simplicity and accuracy of control for the suction and blowing air permits of the production of high grade ware at maximum speeds.

Obviously my invention is not restricted to the details of construction shown and described but extends to the equivalents thereof as well.

What I claim as my invention is as follows:

1. In a glassworking machine, a parison mold having longitudinal side wall suction passages in communication with the cavity thereof, a neck mold associated with said parison mold and having suction passages communicating with the suction passages of the parison mold, mouth forming pin mechanism associated with said neck mold a revoluble mounting for said parison and neck molds by means of which said molds may be oriented to neck end up or neck end down position, a common suction and air pressure supply line in said revoluble mounting and means for applying suction to the neck mold cavity and parison mold cavity when the mouth pin is in closed position therein, and means controlled by the mouth pin in its withdrawn position for admitting pressure air from said supply line to the neck mold cavity to the exclusion of the parison mold cavity.

2. In a glassworking machine, a parison mold having longitudinal side wall suction passages in communication with the cavity thereof, a neck mold associated with said parison mold and having suction passages communicating with the suction passages of the parison mold, mouth forming pin mechanism associated with said neck mold a revoluble mounting for said parison and neck molds by means of which said molds may be oriented to neck end up or neck end down position; a common suction and air pressure supply line in said revoluble mounting, and means for connecting said supply line to the neck mold cavity and parison mold cavity when the mouth pin is in closed position therein, and means controlled by the mouth pin in its fully or partially withdrawn position for connecting said supply line to the neck mold cavity to the exclusion of the parison mold cavity.

3. In a glassworking machine, a parison mold having longitudinal side wall suction passages in communication with the cavity thereof, a neck mold associated with said parison mold and having suction passages communicating with the suction passages of the parison mold, mouth forming pin mechanism associated with said neck mold a revoluble mounting for said parison and neck molds by means of which said molds may be oriented to neck end up or neck end down position; a single suction and air pressure supply line in said revoluble mounting, and means for applying suction to the neck mold cavity and parison mold cavity when the mouth pin is in closed position therein, and means controlled by the mouth pin in its partially withdrawn position for admitting pressure air from said supply line to the neck mold cavity to the exclusion of the parison mold cavity.

4. In a glassworking machine, a parison mold having longitudinal side wall suction passages in communication with the cavity thereof, a neck mold associated with said parison mold and having suction passages communicating with the suction passages of the parison mold, mouth forming pin mechanism associated with said neck mold; a valve casing associated with said neck mold and surrounding said mouth pin mechanism a revoluble mounting for said parison and neck molds by means of which said molds may be oriented to neck end up or neck end down position, a common suction and pressure air supply line in said revoluble mounting communicating with said casing, and means forming a part of said mouth pin mechanism and cooperating with said valve casing for controlling the application of suction from said supply line to the neck mold and parison mold cavities, and for preventing the admission of pressure air from the supply line to the parison mold cavity.

5. In a glassware forming machine, a circular series of parison molds and cooperating neck molds, a rotatable carrier therefor, means for applying suction to the neck and parison mold cavities to compact the charge therein, mouth forming pin mechanism arranged to close the mouth ends of the parison cavities when the glass charges are packed therein and to form an initial blow opening in the mouth end of the parison, means for applying air pressure to the neck mold cavity only in sufficient volume and pressure to blow the packed charge to hollow form while confined in the parison mold, a revoluble mounting for said parison and neck molds by means of which said molds may be oriented to neck end up or neck end down position, a common passage in said revoluble mounting for supplying suction and air pressure to said mold cavity, valve means for alternately supplying suction and air pressure to said passage and means controlled by the movement of the molds actuating said suction and pressure air control valve means.

6. In a glassware forming machine, a circular series of parison molds and cooperating neck molds, a rotatable carrier therefor, means for applying suction to the neck and parison mold cavities to compact the charge therein, mouth forming pin mechanism arranged to close the mouth ends of the parison cavities when the glass charges are packed therein and to form an initial blow opening in the mouth end of the parison, means for applying air pressure to the neck mold cavity in sufficient volume and pressure to blow the packed charge to hollow form while confined in the parison mold a revoluble mounting for said parison and neck molds by means of which said molds may be oriented to neck end up or neck end down position, a common passage in said revoluble mounting for supplying suction and air pressure to said mold cavity, a valve controlling said passage, suction and pressure air lines connected to said valve, and means for operating said valve during movement of the molds to establish communication alternately with said suction and pressure air lines.

7. In a glassware forming machine, a circular series of parison molds and cooperating neck molds, a rotatable carrier therefor, means for applying suction to the neck and parison mold cavities to compact the charge therein, mouth forming pin mechanism arranged to close the mouth ends of the parison cavities when the glass charges are packed therein and to form an initial blow opening in the mouth end of the parison, means for applying air pressure to the neck mold cavity in sufficient volume and pressure to blow the packed charge to hollow form while confined in the parison mold a revoluble mounting for said parison and neck molds by means of which said molds may be oriented to neck end up or neck end down position, a passage in said revoluble mounting for supplying suction and air pressure to said mold cavity, a valve controlling said passage, suction and pressure air lines connected to said valve, means for establishing communication between said suction line and passage as the mold moves into charging position, means automatically controlled by movement of the mold away from the charging position for operating said valve to establish communication between said passages and said pressure air line, to admit pressure air to the neck mold cavity to blow the parison to hollow form, and means to operate said valve after the completion of said blowing operation to cut off communication between said pressure air supply and passage.

EDWARD G. BRIDGES.